April 22, 1958 E. H. GAMBLE 2,831,970

SERVO POWER AMPLIFIER APPARATUS

Filed April 30, 1953 2 Sheets-Sheet 1

INVENTOR.
EDWARD H. GAMBLE
BY Orin R. Severn
his ATTORNEY

April 22, 1958 E. H. GAMBLE 2,831,970

SERVO POWER AMPLIFIER APPARATUS

Filed April 30, 1953 2 Sheets-Sheet 2

*INVENTOR.*
EDWARD H. GAMBLE
*BY* Oun R. Severn
*his ATTORNEY*

2,831,970
Patented Apr. 22, 1958

2,831,970

SERVO POWER AMPLIFIER APPARATUS

Edward H. Gamble, Lancaster, Ohio, assignor to Curtiss-Wright Corporation, a corporation of Delaware Application April 30, 1953, Serial No. 352,136

7 Claims. (Cl. 250—27)

My invention relates to a direct coupled servo amplifier and has as its prime object the provision of a novel and improved wide band servo amplifier of high gain, high stability, and precise linearity, particularly adapted to damp transient fluctuations in the load due to changes in transmitted signal and thereby render the amplifier effective for increasing the speed of a complete servo system.

It is another object of my invention to provide such an amplifier having an output which is relatively independent of the frequency of the transmitted signal.

It is another object of my invention to provide a servo amplifier of the described type which includes means for preventing the amplifier output from becoming excessive at any time.

Other objects and advantages of my invention will become apparent as the course of the specification progresses.

I shall describe one form of my invention and then point out the novel features thereof in claims.

Figure 1:
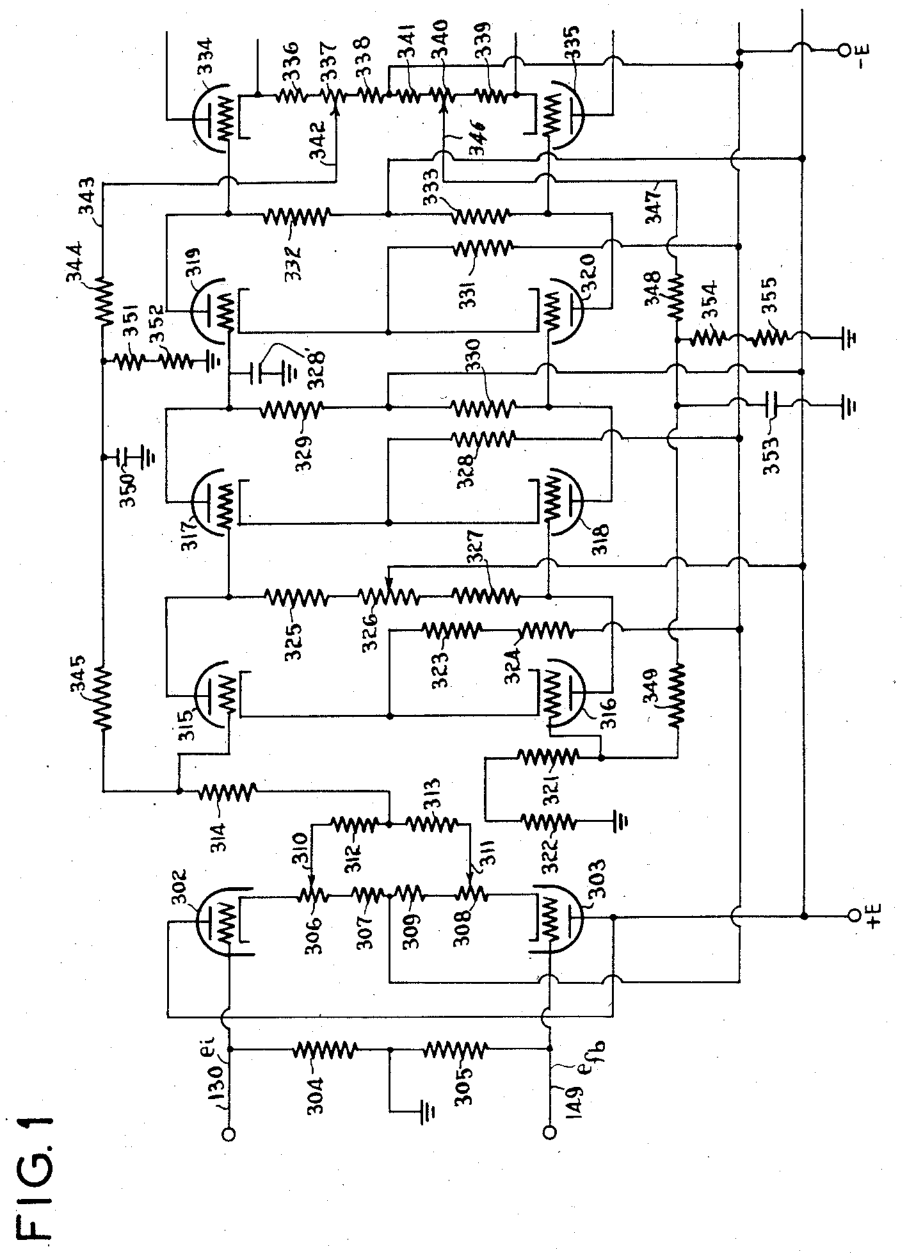
Figs. 1 and 2 are diagrammatic illustrations which taken together show one form of servo amplifier embodying the features of my invention.
Figures 2, 3:
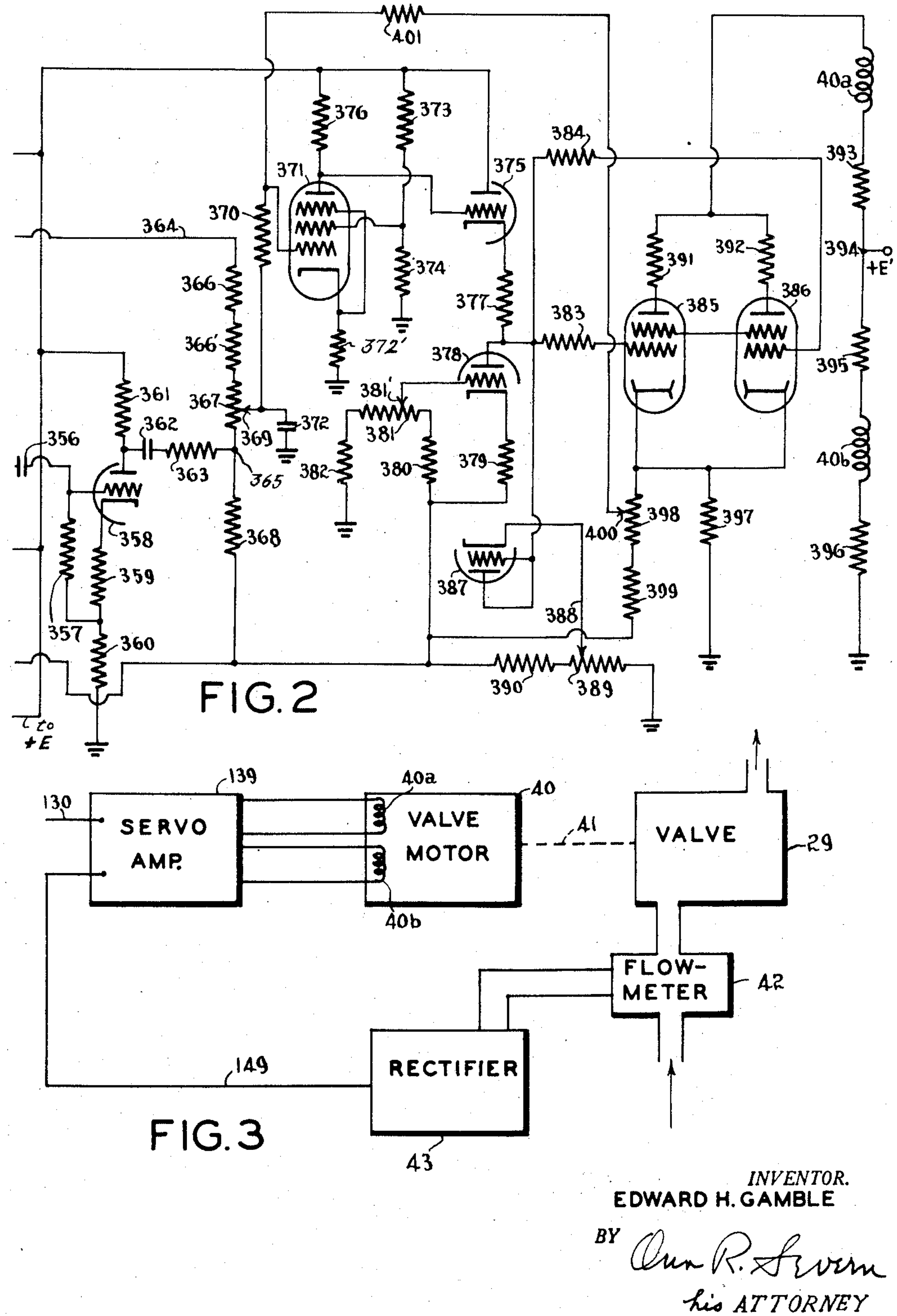
Fig. 3 is a diagrammatic view illustrating the application of my servo amplifier to a servo mechanism system.

Referring to Figs. 1 and 2 of the drawings in a general way, reference characters 130 and 149 designate two input lines respectively which as shown are connected to the grids of similar triodes 302 and 303. Triodes 302 and 303 and associated circuitry constitute a stage for summing the input signals to lines 130 and 149. The summed input signal is direct coupled to a phase inverter stage comprising similar cathode coupled triodes 315 and 316 and associated circuitry. The plate outputs of these triodes (respectively in phase opposition and in phase with the summed signal) are direct coupled to the two halves of a multi-stage push-pull preamplifier consisting of respectively triodes 317, 319 and 334 and associated circuitry, and respectively corresponding triodes 318, 320 and 335 and associated circuitry. Corresponding tubes in each half are similar and their associated circuitry are similar to one another; moreover, except for the triodes 334 and 335, corresponding triodes of each half are cathode coupled to one another for stabilization purposes. Degenerative feedback loops, similar to one another, are provided for each half preamplifier and associated half phase inverter for further stabilization and to provide high linearity. Triodes 334 and 335 are connected as balanced cathode followers and supply their outputs respectively directly and indirectly to a recombining network 364. More particularly the output of triode 335 is fed through a differentiating network consisting of capacitor 356 and the resistor combination consisting of resistor 357 and the cathode circuitry of triode 358, to whose grid the differentiated signal is applied. It should be understood that owing to the phase inversion of triode 316 the outputs of cathode followers 334 and 335 are of opposite polarity and therefore the signal at the grid of triode 358 is the time derivative of a signal of opposite polarity to the signal delivered by triode 334. The output of triode 358 is derived from its plate and is of a polarity opposite to that of the signal applied to its grid, or in other words is, except for the differentiation, a signal of the same polarity as the output signal of triode 334. This output of triode 358 is then combined with the output of triode cathode follower 334 in the combining network 364.

The condition of steady, equal and opposite voltages at the input lines 130 and 149 represents the quiescent condition of the preamplifier as well as of the entire amplifier shown in Figs. 1 and 2. In such case the summed signal derived from triodes 302 and 303 and fed to triode 315 is zero. Assume that quiescent conditions have prevailed for some time and that suddenly the input to one of the lines 130 and 149 is changed as by a step in voltage to the input line 130. The response time of the preamplifier is rapid owing to the heavy feed back employed and to all intents and purposes this step may be treated as substantially instantaneously reproduced at the output tube 334 with reversed polarity and at the output of tube 335 with the same polarity as applied at line 130. The signal derived from tube 335 is differentiated and inverted as explained before so that the signal in the recombining network 364 consists of a voltage step with a superimposed "spike" of the same polarity which rises sharply at the beginning and decays rapidly to the steady step obtained from the triode 334. A recombined signal of this type is particularly useful for ultimate application to a slowly responding device such as a servo motor to overcome its inertia in starting and to limit or preclude overshoot in running.

The amplifier so far discussed is an open loop amplifier and in fact can be so employed according to the invention. The loop can be closed by applying to one of the input lines 130 and 149 an error feedback signal as shown in Fig. 3 wherein line 149 is a feedback line and line 130 is the only true independent input line. In a closed loop system, again assuming initially quiescent steady equal and opposite signals to lines 130 and 149 and again assuming thereafter a sudden step in the input to line 130 with the attendant superimposition of amplified original signal and superimposed spike, a signal of opposite polarity arrives at the feedback line some time after the step in the input line owing to the slow response of the servo motor. This delayed signal is combined with the step input signal in the summing cathode followers 302 and 303 in opposition to the step and propagated through the preamplifier. It is also differentiated and recombined and serves to bring the servo motor to a stop as quickly as possible once the feedback signal becomes equal and opposite to the step applied to the line 130 thereby limiting overshoots and precluding hunting.

Considering the circuitry of Figs. 1 and 2 in greater detail, the grids of triodes 302 and 303 are connected to ground through resistors 304 and 305 respectively, and their plates are connected to a steady positive direct supply voltage +E. The cathode of triode 302 is connected to a steady negative direct supply voltage −E through resistors 306 and 307, and the cathode of triode 303 is connected to such negative supply voltage through resistors 308 and 309. Resistors 306 and 308 are adjustable as shown for balancing purposes and have their slider contacts 310 and 311 connected through similar summing resistors 312 and 313 respectively and through resistor 314 to the grid of triode 315, one tube of the phase-inverting amplifier comprising triodes 315 and 316. The signal applied from the junction of resistors 312 and 313 through resistor 314 to the grid of triode 315 will be referred to hereinafter as the summed signal.

The grid of triode 316 as shown is connected to ground through resistors 321 and 322, and the cathodes of triodes 315 and 316 are connected together and to the negative supply voltage —E through resistors 323 and 324. The plates of triodes 315 and 316 are connected to the grids of triodes 317 and 318 respectively, and the plate of triode 315 is also connected to the positive supply voltage +E through resistor 325 and one portion of resistor 326 which is adjustable for balancing purposes whereas the plate of triode 316 is also connected to the positive supply voltage through resistor 327 and the other portion of adjustable resistor 326. The summed signal appears in amplified form but reversed in phase at the plate of triode 315 and therefore at the grid of triode 317. A signal in phase with the summed signal appears at the cathode of the triode 315 and, in view of the coupling of the two cathodes, also at the cathode of the triode 316. The grid of the triode 316 may for the time being be assumed to be grounded signal-wise through resistors 321 and 322. Accordingly the triode 316 operates in a manner similar to the well known "grounded grid" amplifier with input signal to the cathode rather than to the grid. Moreover in accord with grounded grid amplifier operation the signal at the plate of triode 316 and therefore at the grid of triode 318 is amplified and is in phase with the signal applied to the cathode of triode 316 and therefore with the summed signal. The triodes 315 and 316 thus operate as a phase inverter. As will be seen hereinafter, the grid of triode 316 strictly is not grounded signal-wise; rather it receives a negative feedback signal. The aforegoing considerations hold true nevertheless.

The cathodes of triodes 317 and 318 are connected together and to the negative supply voltage —E through resistor 328, and the plates of triodes 317 and 318 are connected to the grids of triodes 319 and 320 respectively. Accordingly the signal at the plate of triode 317 and therefore at the grid of triode 319 is in phase with the summed signal and the signal at the plate of triode 318 and therefore the grid of triode 320 is in phase opposition to said summed signal. The triodes 317 and 318 accordingly operate as a push-pull amplifier. Connected between the grid of triode 317 and ground is a low capacitance condenser 328'. The plate of triode 317 is also connected to the positive supply voltage +E through resistor 329, and the plate of triode 318 is, connected with the positive supply voltage through resistor 330.

The cathodes of triodes 319 and 320 are connected to the negative supply voltage —E through resistor 331, and the plate of triode 319 is connected to the positive supply voltage +E through resistor 332, whereas the plate of triode 320 is connected to the positive supply voltage through resistor 333. The plates of triodes 319 and 320 are also connected to the grids of triodes 334 and 335 connected as push-pull cathode followers so that the outputs of the multi-stage push-pull amplifiers are the inputs to the push-pull cathode followers. Accordingly the signal at the plate of triode 319 and therefore also at the grid and at the cathode of triode 334 is in phase opposition to the summed input signal whereas the signal at the plate of triode 320 and therefore at the grid and at the cathode of triode 335 is in phase therewith. The triodes 319 and 320 thus operate as second stages of push-pull amplification.

As shown, the plates of tubes 334 and 335 are connected to the positive supply voltage +E. The cathode of triode 334 is connected to the negative supply voltage —E through resistors 336, 337 and 338, whereas the cathode of triode 335 is connected to the negative supply voltage through resistors 339, 340 and 341. Resistor 337 is adjustable and has its slider contact 342 connected by a feed-back line 343 including resistors 344 and 345 to the grid of triode 315 to provide a feed-back voltage (the voltage at the cathode of triode 334 as attenuated at line 342) 180° out of phase with the summed signal input to triode 315. Resistor 340 is also adjustable and has its slider contact 346 connected to another and similar feed-back line 347 which includes resistors 348 and 349 to provide a feed-back voltage (the voltage at the cathode of triode 335 as attenuated at line 346) in phase with the summed signal input to triode 316. It will be recalled that the input signal to triode 316 is applied to its cathode from the cathode of triode 315 and that this signal is in phase with the summed signal voltage. The in-phase relationship of the feed-back voltage to triode 316 to the input voltage thereto is proper for degeneration in the case of an input to the cathode rather than to the grid. The function of the feed-back voltages to triodes 315 and 316 is to increase linearity and improve stability within the amplifier. In order to prevent uncontrolled oscillation in the feed-back line each is returned to ground through resistance-capacitance circuitry. Thus, as shown line 343 is connected to ground through condenser 350 and through resistors 351 and 352, and line 347 is connected to ground through condenser 353 and through resistors 354 and 355.

Suitable circuitry is provided to damp out transient fluctuations in the load due to changes in transmitted signal, occasioned, for example, by a sudden change in signal level of input signal $e_1$ to line 130 and occurring for a period following the sudden change until the signal settles down to a new value. Such circuitry includes condenser 356 and resistor 357 which are connected as shown with the cathode of triode 335 and are provided to differentiate a changing signal output of triode 335. As is characteristic of cathode followers, triode 335 presents a very high input impedance to the preceding amplifier chain and in that sense serves to isolate such preceding circuitry from the subsequent differentiating circuitry. Also as is characteristic of cathode followers the triode 335 presents a low output impedance and low output capacitance at its cathode thereby permitting substantially pure differentiation by means of the capacitor 356 and resistor 357. The differentiated signal output of triode 335 is amplified and shifted 180° in phase by means of triode 358 which has its grid connected to condenser 356 and resistor 357 in the manner shown. Triode 358 has its cathode connected to ground through resistors 359 and 360. Resistor 357 as shown is connected to ground through resistor 360 which may be made adjustable for regulating the gain of triode 358. The plate of triode 358 is connected to the positive supply voltage +E through resistor 361 and is also connected through blocking condenser 362 and resistor 363 to a network 364 at junction 365. Network 364 includes resistors 366, 366', 367 and 368 and has one end connected to the cathode of triode 334. The other end of network 364 is connected to the negative supply voltage —E.

The differentiated signal output of triode 335 as amplified and shifted in phase by means of triode 358 is summed in network 364 across resistance 368 with the signal output of triode 334 to damp the transient fluctuations in the load due to change in transmitted signal, the circuitry hereinbefore referred to for differentiating a changing signal output of triode 335 having been chosen to effect a maximum amount of damping. Resistor 367 in network 364 is adjustable as shown and has its slider contact 369 connected through grid resistor 370 to the control grid of voltage amplifying pentode 371. A combined original plus differentiated signal is thus picked off resistor 367 by slider contact 369 and impressed upon the grid of tube 371 for further amplification. Slider contact 369 is connected to ground as shown through condenser 372.

Pentode 371 has its cathode and suppressor grid connected to ground as shown through resistor 372' and the screen grid is properly biased by means of series connected resistors 373 and 374 which are connected between ground and the positive supply voltage +E. The plate of tube 371 is connected to the grid of triode 375 and is connected also through resistor 376 to the positive supply voltage +E. Triode 375 is connected in circuit to function as a cathode follower and has its plate connected to the positive supply voltage +E, whereas its cathode is connected through a resistor 377 to the plate of triode 378. The cathode of triode 378 is connected to the negative supply voltage −E through resistor 379 and its grid is biased by means of series connected resistors 380, 381 and 382 which are connected between ground and the negative supply voltage −E. As shown resistor 381 is adjustable and its slider contact 381' is connected to the grid of triode 378. The plate of triode 378 is connected through grid resistors 383 and 384 to the control grids of paralleled current amplifying tetrodes 385 and 386 respectively. Such control grids are negatively biased by means of triodes 375 and 378 and resistors 377 and 379, and such biasing circuitry provides a low impedance looking back into the amplifier from the current amplifying tubes. Current amplifying tubes 385 and 386 have a high current output which is rendered relatively independent of frequency changes owing to such low impedance of the biasing circuitry.

Limiting means are provided for preventing the amplifier output from becoming excessive at any time and this is accomplished by preventing the amplitude of the signal input to the grids of tetrodes 385 and 386 from exceeding a predetermined maximum value. The limiting means includes triode 387 which has its plate and grid connected to the plate of triode 378 so that both are at the same potential and triode 387 functions as a diode. The cathode of triode 387 is connected to a slider contact 388 which is positionable on resistor 389 and connects the cathode through some portion of resistor 389 according to the position of slider contact 388 and through resistor 390 with the negative supply voltage. When the potential at the plate of triode 378 and on the grids of tetrodes 385 and 386 becomes sufficiently positive triode 387 conducts to complete a circuit through the tube to the negative supply voltage −E and prevent peak signals having an amplitude greater than a predetermined maximum from appearing on the grids of tubes 385 and 386.

It will be understood that the various tubes of the amplifier will be provided with heaters for the tube filaments. Such heaters may for example be energized from an available A. C. supply, provided the supply voltage is stepped down to a suitable value by transformers.

In the form of my invention shown in the accompanying drawings the amplifier is adapted to control the operation of a linear torque motor such as shown and described in my copending application Serial No. 322,063, filed November 22, 1952, now Patent No. 2,718,614 granted September 20, 1955, having two pair of series connected coils which cause the motor armature to move an amount which is dependent upon the magnitude of the current flowing in one pair of coils as compared to the current flowing in the other pair of coils. In the drawings, reference character 40*a* is intended to designate one such pair of coils and reference character 40*b* designates the other pair of coils. As shown, the plates of current amplifying tubes 385 and 386 are respectively connected through resistors 391 and 392, and thence through one pair of series connected coils 40*a* and through resistor 393 to junction 394 which is maintained at a steady direct positive potential +E'. Connected between junction 394 and ground are resistors 395 and 396 and the other pair of series connected coils 40*b*. The cathodes of tubes 385 and 386 are connected to ground through resistor 397 and to the negative supply voltage −E through resistors 398 and 399. Resistor 398 is adjustable and has its slider contact 400 connected through resistor 401 to the grid of pentode 371 to provide a feed-back voltage 180° out of phase with the input signal to that tube for improved linearity and increased stability within the amplifier.

Tubes 385 and 386 are selected and the hereinbefore described associated circuitry is designed to provide an equal current flow in each pair of series connected coils in the absence of a signal on the control grids of the current amplifying tubes. However, when a signal is impressed on the grids of these tubes the current flow is altered in the one pair of coils 40*a* and the motor caused to operate. The altered current flow in coils 40*a* is at any time linearly proportional to the difference between the input and feedback signals to the amplifier, and movement of the motor armature is also linearly proportional to the difference between these signals.

One application of my servo amplifier is in a servomechanism system such as shown in Fig. 3 of the drawings wherein the amplifier is utilized to control the operation of a rotary hydraulic valve 29 in accordance with an input and feed-back signal to the amplifier fed over lines 130 and 149 respectively. Rotary valve 29 may be of the type shown and described in the copending application of Elwyn Peters, Serial No. 323,179, filed November 29, 1952, and assigned to the assignee of this application, wherein the flow of fluid through the valve is linearly proportional to movement of the valve spindle. The motor armature and valve spindle are connected by suitable connecting means 41 and the flow of fluid through the valve is therefore linearly proportional to movement of the motor armature and to the difference between the input and feed-back signals to amplifier 139. The signal which is fed to the amplifier over line 149 is generated by means of a flowmeter 42 of any suitable type for generating an A. C. signal which is linearly proportional to the flow of fluid through it. As indicated fluid flowing through valve 29 also flows through the flowmeter to generate an A. C. signal proportional to fluid flow through the valve and this signal is rectified to a D. C. signal by rectifier 43 and fed to amplifier 39 over line 149 in inverse feedback relation to the input signal $e_1$. The valve motor comes to a stop in the desired correct position when the inputs to lines 130 and 149 become equal and opposite.

The application of my amplifier to a servomechanism such as shown in Fig. 3 is intended to be illustrative only and not to limit the invention in any way. Also it is to be understood that various changes and modifications may be made in my invention within the scope of the appended claims without departing from the spirt and scope of the invention.

What is claimed is:

1. In a servo system, an amplifier for amplification of input voltage signals of a wide band of frequencies from direct voltages on up, comprising direct-coupled phase inverting means for producing an in phase signal and a phase opposition signal in accordance with an input signal, a direct coupled push-pull amplifier connected to said phase inverting means and including a pair of cathode follower connected output stages, a differentiating network connected to one of said cathode follower stages for substantially purely differentiating the output signal thereof, means for reversing the polarity of said differentiated signal, and means for combining with said differentiated-signal of reversed polarity of the output of the other of said cathode followers.

2. In a servo system, an amplifier for amplification of input voltage signals of a wide band of frequencies from direct voltage on up, comprising a plurality of cathode followers for application thereto of separate input signals, direct coupled means for summing the outputs of said cathode followers thereby to produce a signal representing the summation of said input signals, direct coupled means for phase inverting said summed signal thereby to produce a signal in phase with said summed signal and a signal of opposite phase to said summed signal, a direct coupled push-pull amplifier connected to said phase inverting means and including a pair of output cathode followers, means for substantially purely differentiating the output of one of said output cathode followers, means for reversing the polarity of the differentiated signal, and means for recombining with the output of said reversing means the output of said other output cathode follower.

3. The combination as in claim 2 with the inclusion of direct coupled means for further amplifying the recombined signal and of a direct coupled current amplifying stage connected to said means for further amplifying the recombined signal.

4. The combination as defined in claim 3 with the inclusion of means for limiting the input to the current amplifier thereby to limit its current to a predetermined value.

5. The combination as defined in claim 3 wherein the means for further amplifying the recombined signal includes as a stage immediately preceding the current amplifier a cathode follower for providing a low impedance as seen looking back from the current amplifier.

6. In a servo system including a servomotor having a plurality of motor coils and operable responsive to difference in currents through said coils, a utilization device adapted to be positioned by said servo motor, and means for producing a voltage representative of the position of said utilization device, the combination comprising an amplifier having two inputs one of which is connected to said position representative voltage producing means and the other adapted to have applied thereto a control signal for positioning said motor and utilization device, said amplifier comprising two cathode followers direct coupled respectively to said amplifier inputs, direct coupled means for summing the outputs of said cathode followers, a direct coupled phase inverter connected to said summing means for producing a signal in phase with said summed signal and a signal in phase opposition to said summed signal, a push-pull amplifier direct coupled to said phase inverter and including a pair of push-pull output cathode followers, means for substantially purely differentiating the output of one of said push-pull cathode followers, means for reversing the phase of said differentiated output, means for recombining the phase reversed differentiated signal with the output of the other of said push-pull cathode followers, direct coupled means including an output driver cathode follower for further amplifying said recombined signal, a current amplifier including an electron discharge device having at least an anode, a cathode and a grid, direct current means connecting said grid to said driver cathode follower, a source of operating potential having a positive and a negative terminal, a direct current connection from said cathode to said negative terminal, a direct current connection from said anode to said positive terminal, one of said last-mentioned direct current connections including at least one of said motor coils; and means for passing through at least one of the other of said motor coils a current substantially equal to the current passing through said one motor coil included in said one direct current connection when the inputs to said amplifier are substantially equal and opposite.

7. In a servo system including a linear torque motor having a plurality of motor coils and operable responsive to difference in currents through said coils, a fluid flow valve positionable by said motor, and means for producing a direct voltage signal representative of the flow of fluid through said valve, the combination comprising a preamplifier having two inputs one of which is connected to said position representative voltage producing means and the other adapted to have applied thereto a control signal for positioning said motor and valve, said preamplifier comprising direct coupled means for summing the signals to said inputs, direct coupled means for amplifying the summed signals, means isolated from the last-mentioned amplifying means for substantially purely differentiating a signal representing said summed signals, means for recombining the differentiated and amplified summed signals; a current amplifier including an electron discharge device having at least an anode, a cathode and a grid; direct coupled means connecting said grid to said recombining means; a source of operating potential having a positive and a negative terminal; a direct current connection from said cathode to said negative terminal and a direct current connection from said anode to said positive terminal, one of said last-mentioned direct current connections including at least one of said motor coils; and means for passing through at least one of the other of said motor coils a current substantially equal to the current passing through said one motor coil included in said one direct current connection when the inputs to said preamplifier are substantially equal and opposite.

References Cited in the file of this patent

UNITED STATES PATENTS

| | | |
|---|---|---|
| 2,380,947 | Crosby | Aug. 7, 1945 |
| 2,396,187 | Means et al. | Mar. 5, 1946 |
| 2,561,319 | Runyan | July 17, 1951 |
| 2,583,552 | Edwards | Jan. 9, 1952 |
| 2,729,772 | Perkins | Jan. 3, 1956 |